United States Patent [19]

Forster

[11] 4,406,491
[45] Sep. 27, 1983

[54] MOUNTING OF AIRFOIL MEMBERS ON LAND VEHICLES

[76] Inventor: Paul Forster, 93 Petersham Rd., Richmond, Surrey, England

[21] Appl. No.: 306,478

[22] Filed: Sep. 28, 1981

[30] Foreign Application Priority Data

May 11, 1981 [GB] United Kingdom ............ 8114366

[51] Int. Cl.³ .............................................. B62D 37/02
[52] U.S. Cl. .................................. 296/1 S; 224/316; 224/331; 403/97
[58] Field of Search ............... 296/1 S; 224/316, 331; 403/97, 93

[56] References Cited

U.S. PATENT DOCUMENTS

| 562,949 | 6/1896 | Casler | 403/97 |
| 2,212,068 | 8/1940 | Humphreys | 403/97 |
| 3,596,974 | 8/1971 | Adams | 296/1 S |
| 3,853,371 | 12/1974 | Bienert | 296/1 S |
| 3,920,167 | 11/1975 | Parsons | 224/331 |

FOREIGN PATENT DOCUMENTS

| 405962 | 7/1966 | Switzerland | 224/331 |
| 1315182 | 4/1973 | United Kingdom . | |
| 1520554 | 8/1978 | United Kingdom . | |
| 1544478 | 4/1979 | United Kingdom . | |
| 2021059 | 11/1979 | United Kingdom . | |
| 1576811 | 10/1980 | United Kingdom . | |

*Primary Examiner*—Robert R. Song
*Attorney, Agent, or Firm*—Brumbaugh, Graves, Donohue & Raymond

[57] ABSTRACT

Mounting means for an airfoil member for mounting the member above the roof of the cab of a tractor in order to reduce the air-drag on the trailer unit, the inclination of the airfoil member being adjustable by clampable pivot means provided in support arms. At the right hand clampable pivot point, a pair of grip washers having undulations are welded to the support arm and tube bracket and urged into light clamping contact by means of a spring washer and nut and bolt. At the left hand clampable pivot point, a pair of grip washers having undulations are likewise welded to the support arm and tube bracket, and rigidly held in engagement by means of a head having an internally threaded portion engaging with the threaded shank of a bolt, a detachable handle being provided for quick clamping, and release to thus enable the driver to release the clamping mechanism and reset the inclination of the airfoil member in minimum time and effort.

10 Claims, 15 Drawing Figures

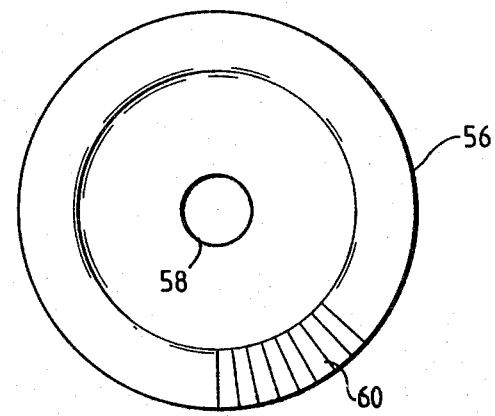
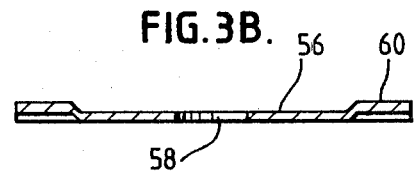
FIG.3A.
FIG.3B.
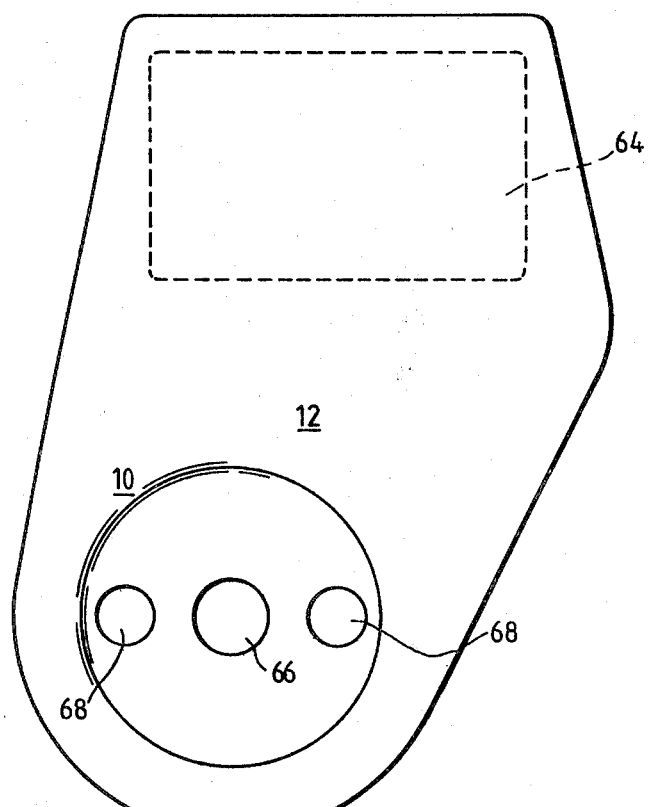
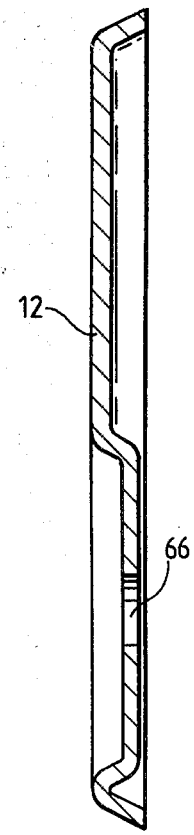
FIG.4A.
FIG.4B.

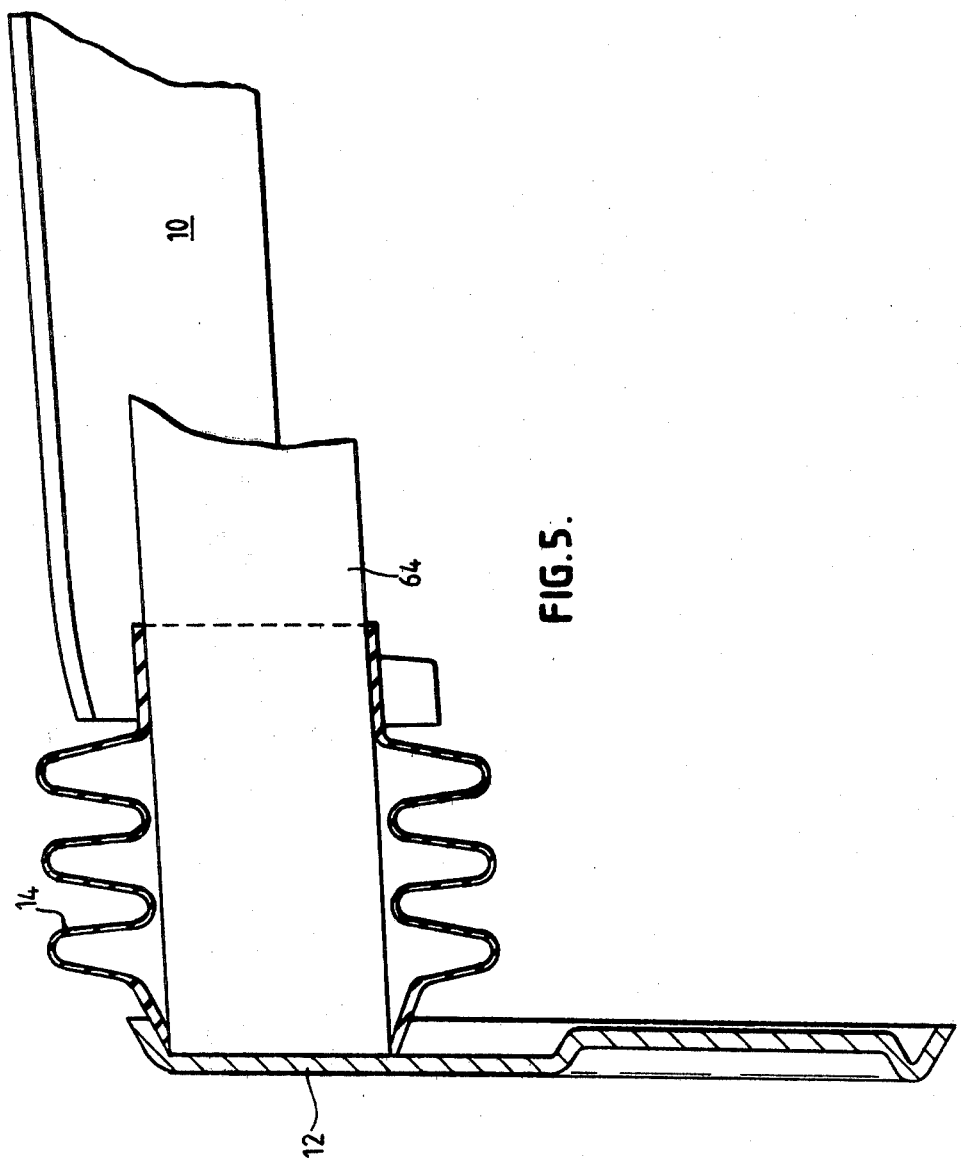

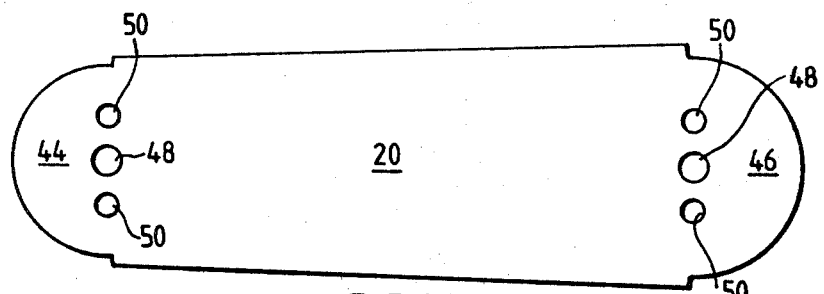 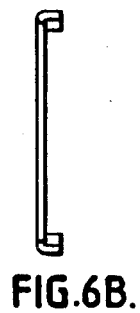
FIG.6A.   FIG.6B.
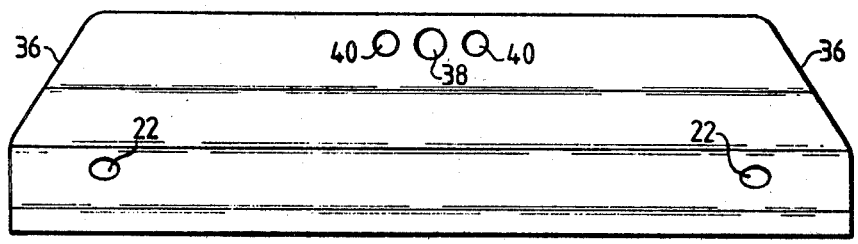 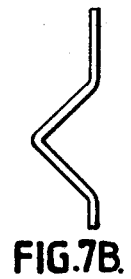
FIG.7A.   FIG.7B.
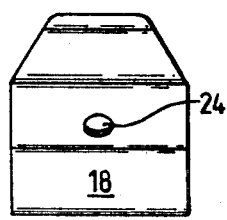 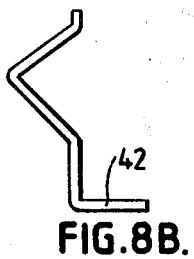
FIG.8A.   FIG.8B.
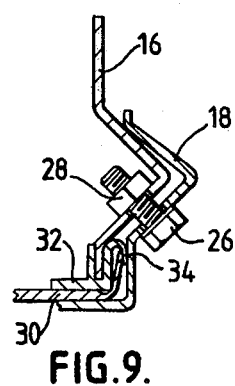
FIG.9.

MOUNTING OF AIRFOIL MEMBERS ON LAND VEHICLES

FIELD OF THE INVENTION

The present invention relates to the mounting of airfoil members which can be used either as air deflectors or airfoils on land vehicles.

DESCRIPTION OF THE PRIOR ART

Air deflectors or drag reducers (as they are sometimes known) for land vehicles are well known.

The majority of the known air deflectors are fixed structures arranged on top of the cab of the tractor of a tractor-trailer rig. In these days when large articulated vehicles up to 44 metric tons are permitted to travel on the roads in the countries of the European Economic Community, it is important from the point of view of fuel economy to reduce the drag that the upper part of the front of the trailer exerts on the combined tractor-trailer rig due to wind resistance.

One type of fixed air deflector for reducing this drag due to wind resistance is disclosed in British Patent Specification No, 1,544,478. This air deflector is in the form of a curved plate which is secured to the rear part of the roof of the cab of the tractor unit. The wind is deflected upwards, with the result that the majority passes over the top of the roof of the trailer unit so that the top front section thereof experiences a reduced amount of wind resulting in reduced drag on the combined tractor-trailer rig as a whole.

An adjustable type of air deflector is disclosed in British Patent Specification No. 1,520,554. This type is fixed at the front and has two adjustable struts which connect it to the roof of the cab at the rear.

The use of airfoils on land vehicles is also well known, but their use is not intended to reduce drag, but on the contrary to stabilize the vehicle. For example, it is well known to use an airfoil on the rear of a racing car in order to apply weight to the rear wheels of the car when cornering. It is also well known to use an airfoil on the top of a car towing a caravan, but the airfoil is used as a deflector and not an airfoil in the strict sense. Such a deflector is shown in British Patent Specification No. 1,315,182. The airfoil is fixed at an angle of substantially 45° to the horizontal to deflect air upwards over the top of the caravan.

In copending application Ser. No. 306,476 in the name of Stuart Victor Mason, (filed on the same date as the present application), there is disclosed the use of an airfoil member mounted on the roof of the tractor cab of a tractor-trailer unit, so that it can be used to reduce drag due to wind resistance when the tractor is driven without the trailer or when the height of the trailer is less than the height of the cab of the tractor.

However, where the tractor of a tractor-trailer unit may be used to pull a large number of loads which may differ very greatly from one another both in size and shape and may also be used without a trailer, it is essential that the air deflector be readily adjustable by the driver of the tractor so that he can quickly make the necessary adjustments to the air deflector to suit the particular trailer next to be drawn, or to use it as an airfoil in the case where either no trailer is towed or the height of the trailer is less than that of the tractor. It will be appreciated that a skilled driver will know exactly how to set the air deflector for any particular trailer so that all that is required is a simple clampable mounting device which can be easily and quickly released by the driver, reset to a new position, and reclamped without him having to spend time in undoing and doing up a lot of nuts and bolts, and without him having to call for assistance in resetting the air deflector.

SUMMARY OF THE INVENTION

It is therefore an object of the present invention to overcome partially or wholly the above mentioned disadvantages.

According to the present invention there is provided mounting means for an airfoil member which member can act either as an airfoil and/or an air deflector, said mounting means including: support means for holding said airfoil member; pivot means to enable said airfoil member to be rotated about a longitudinal horizontal axis (when mounted on a vehicle) between positions where it acts as an airfoil and a position or positions where it acts as an air deflector; releasable clamping means associated with at least one pivot means, which hold the airfoil member in any desired position; manually operable means to enable said clamping means to be quickly released; and means for securing the support means to the roof of a land vehicle.

Preferably said clamping means comprises a pair of grip washers attached to the two parts of the pivot means at each end of the airfoil member. The grip washers may be provided with undulations or triangular teeth around an outer peripheral zone of a flat ring.

Preferably said manually operable means comprises a rotatable head on at least one of the clamping means, which on being rotated separates the two grip washers to allow relative movement therebetween. The rotatable head may be provided only at one pivot point, in which case the other pivot point is lightly clamped by means of a pair of spring washers.

BRIEF DESCRIPTION OF THE DRAWINGS

The present invention will now be described in greater detail by way of example with reference to the accompanying drawings wherein:

FIGS. 3A and 3B are, respectively, plan and elevation views of a clamping ring;

FIGS. 4A and 4B are, respectively, side and front elevation views of an airfoil support plate;

FIG. 5 shows the detail of a gaiter associated with the airfoil support;

FIGS. 6A and 6B are, respectively, side and front elevation views of a support arm;

FIGS. 7A and 7B are, respectively, side and front elevation views of a gutter bracket;

FIGS. 8A and 8B are, respectively, side and front elevation views of a gutter clamp; and FIG. 9 is a detail of the gutter bracket and clamp when located in position on the gutter rail of the cab of a vehicle.

DESCRIPTION OF THE PREFERRED EMBODIMENT

Figure 1:
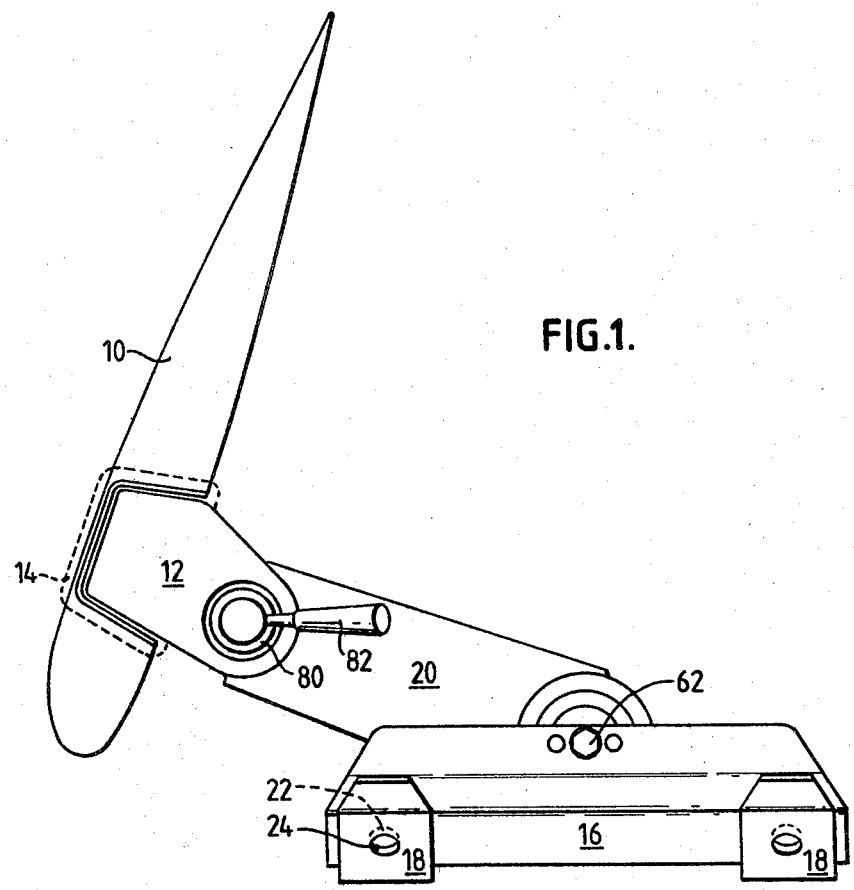
FIG. 1 is a side elevation view of one preferred form of mounting means for an airfoil member which is designed to be used either as an air deflector or an airfoil.

The constructions of the airfoil member itself will be evident from FIG. 1 of copending application Ser. No.

306,476 referred to above. The airfoil member 10 is secured to a support plate 12 by means of an adjustable tube (referred to later) which is surrounded by a protective and decorative gaiter 14, whose profile is shown in greater detail in FIG. 5. Gutter brackets 16 are mounted on the gutter rail on either side of the cab of a tractor unit (not shown) by means of gutter clamps 18, there being two such clamps on either side. A pair of support arms 20 secure the plates 12 and hence the airfoil member 10 to the gutter brackets 16.

Each gutter bracket 16 is provided with a pair of holes 22, one at each end and the two gutter clamps 18 each have a hole 24 of identical size to enable a bolt 26 (FIG. 9) to pass through both holes 24 and 22. A nut 28 enables the gutter clamp to grip the gutter support and hold it firmly clamped to the gutter rail 30 (FIG. 9) of the cab of the tractor unit. A nylon extrusion 32 has a "U"-shaped section into which the bottom edge of the gutter bracket 16 slots, and an inverted hook-shaped portion 34 which goes over the top of the gutter rail 30 and is squeezed between the gutter rail 30 and the gutter clamp 18.

The shape of each gutter bracket 16 is shown in FIGS. 7A and 7B. The upper longitudinal edge is shorter than the lower longitudinal edge, by virtue of the provision of sloping edge portions 36. A central hole 38 and two slightly smaller holes 40, one on either side of the central hole 38 are provided as shown in FIG. 7A. The central zone of the gutter bracket 16 is "V"-shaped as shown in FIG. 7B. The holes 22 are provided in the lower arm of the V-shaped central zone.

The shape of each gutter clamp 18 is shown in FIGS. 8A and 8B. The upper zone of the gutter clamp 18 is "V"-shaped as shown in FIG. 8B, the hole 24 being provided in the lower arm of the V-shaped upper zone. A horizontally extending arm 42 at the bottom of the gutter clamp 18 is provided to engage under the gutter rail.

The shape of the support arm 20 is shown in FIGS. 6A and 6BB. The ends of the support arm are provided with semi-circular portions 44 and 46 of slightly smaller diameter than the respective ends, the support arm tapering slightly so that the semi-circular portion 44 is smaller than the semi-circular portion 46. Holes 48 are provided in the geometric centers of the respective semi-circular portions 44 and 46. A pair of holes 50 are provided on either side of the hole 48 at each end of the support arm 20. As shown in FIG. 6B, the support arm comprises a central straight section 52 having short extensions 54 at either end which are bent at a right angle in order to make the support arm rigid.

The pair of holes 40 in each gutter bracket 16 are used as weld points to enable a grip washer to be welded thereto. Likewise the pair of holes 50 in each support arm 20 are used as weld points to enable a similar grip washer to be secured thereto.

The grip washers are shown in greater detail in FIGS. 3A and 3B. Each grip washer comprises a flat ring 56 having a central hole 58. On the upper face of the ring 56, there is provided an undulated track 60 in an outer peripheral zone. In the form shown this consists of alternating convex and concave sections, but they could equally well be sinusoidal. Alternatively an annular row of equi-spaced triangular teeth could be provided in the outer peripheral zone.

The support arm 20 can thus be rigidly clamped to the support bracket 16 with the aid of a bolt 62 which passes through the holes 38 and 48 and a threaded nut (not shown), the whole structure being held rigid once the bolts are done up by means of the mating undulated surfaces of the rings 56 respectively welded to the support arm 20 and the gutter bracket 16.

As shown in inclination of the support arm 20 relative to the horizontal is about 20°, but the angle of inclination is adjustable to suit the height of the cab of the tractor. However, once fixed to the cab of a tractor and correctly set to the appropriate angle, no further adjustment between the support arm 20 and the gutter bracket 16 is necessary.

Pivotally mounted on the other end of the support arm 20 is the tube bracket 12. The tube bracket itself is shown in greater detail in FIGS. 4A and 4B, and also FIG. 5. Welded to the upper section of the tube bracket 12 is a tube 64, which is adapted to slide in and out of the airfoil member 10. This is to enable the airfoil mounting device to be readily adjusted to fit different widths of cab roofs. Once in position the tube 64 can be clamped to the airfoil member 10. At its lower end the support arm 12 is provided with a hole 66 and a pair of holes 68 on each side thereof. A grip washer 56 is welded to the lower section of the support arm 12 through the holes 68, and a similar grip washer is welded to the upper or smaller end of the support arm 20 through holes 50.

Figures 2A, 2B:
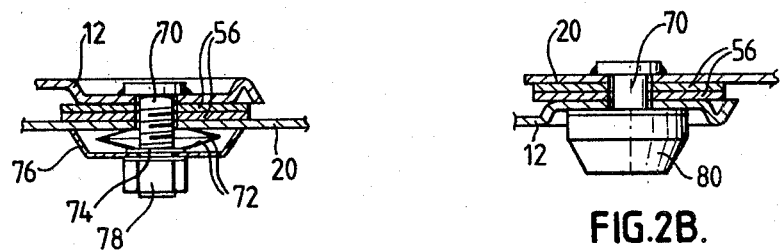
FIGS. 2A and 2B, respectively, show the right and left pivot points and clamping means for the airfoil member in relation to the support arm.

The clamping means for clamping the airfoil 10 in a given desired inclination to the horizontal is shown in FIGS. 2A and 2B. For a left hand drive tractor unit the clamping means for the right and left hand sides are, respectively, shown in FIGS. 2a and 2B. The converse would be true for a right hand drive vehicle. In each case the undulated surfaces of the grip washers 56 are held in mating contact by means of a bolt 70 whose head is welded to the tube bracket 12 in FIG. 2A and the support arm 20 in FIG. 2B.

In the case of the right hand clamping means shown in FIG. 2A, a pair of spring washers 72, which may be Belville washers, are positioned between the support arm 20 and a flat washer 74. A cup 76 encloses the spring washers 72, the rim of which is sealed to the surface of the support arm 20 in order to prevent the ingress of dust. A threaded nut 78 engages the threaded shank of the bolt 70 in order to clamp the grip washers 56 together lightly, thus enabling the right hand clamping means to support half the weight of the airfoil 10, and thus to be rotatable by the driver when the clamping means at the other end has been released.

In the case of the left hand clamping means shown in FIG. 2B, a bevelled head 80 has an internally threaded hole to engage the threaded shank of the bolt 70. A handle 82 engages in a hole (not shown) in the head 80, to enable quick release and reclamping of the left hand clamping means. The handle 82 is preferably removable so that it can be stowed in the cab of the tractor unit to prevent unauthorized tampering of the inclination of the airfoil member 10.

In order to alter the inclination of the airfoil member 10, or to convert it from acting as an air deflector to an airfoil and vice versa, the driver has only to take the handle 82, place it into the rotatable head 80, and rotate the head in order to unclamp the grip washers 56 in the left hand clamping means shown in FIG. 2B. With his hands he can then exert enough pressure to rotate the airfoil member 10 to any desired inclination against the lightly clamped grip washers 56 in the right hand clamping means shown in FIG. 2A. When he has set the airfoil member 10 to the desired inclination he reclamps the left hand clamping means by rotating the head 80 with the handle 82. On reclamping, the handle 82 is removed and restowed in the cab.

It will be appreciated from the above description that the resetting of the airfoil member is remarkably easily and quickly achieved by one man alone. Moreover, by setting it to the correct angles for journeys involving trailer units of differing sizes and shapes, a considerable fuel saving is achieved since the drag due to wind resistance can be kept to a minimum.

What I claim and desire to secure by Letters Patent is:

1. A mounting means for an airfoil member, which member acts selectively either as an airfoil or an air deflector depending upon its adjustment relative to the horizontal, said mounting means including: a pair of support means for holding the respective ends of said airfoil member; a pair of pivot means associated with each respective support means to enable said airfoil member to be rotated about a longitudinal horizontal axis when mounted on a vehicle between a position in which it acts as an airfoil and positions in which it acts as an air deflector; a pair of releasable clamping means associated with respective pivot means, which clamping means when clamped hold the airfoil member in any desired position against the pressure of the air; manually operable means associated with the clamping means on one side only, to enable both pairs of clamping means to be released quickly; and a pair of securing means to enable respective support means to be secured to opposite sides of the roof of said vehicle, whereby said airfoil member can be set to a desired position from only one side of the said vehicle.

2. The mounting means according to claim 1, wherein each said clamping means comprises a pair of grip washers attached to respective parts of the pivot means.

3. The mounting means according to claim 2, wherein the grip washers of each pair are provided with undulations arranged around an outer peripheral zone of a flat ring.

4. The mounting means according to claim 2, wherein the grip washers of each pair are provided with triangular teeth arranged in equi-shaped relation around an outer peripheral zone of a flat ring.

5. The mounting means according to claim 2, wherein said manually operable means comprises a rotatable head, which on being rotated separates the two grip washers associated with the one clamping means and also the two grip washers associated with the clamping means at the opposite side of the airfoil member, to allow relative movement between the pairs of grip washers.

6. The mounting means according to claim 5, wherein the grip washers associated with the clamping means at the side opposite to the rotatable head, are clamped sufficiently by means of spring members.

7. The mounting means according to claim 6, wherein said spring members are a pair of spring washers.

8. The mounting means according to claim 5, wherein said rotatable head is provided with a detachable handle for manual rotation thereof, to enable quick release of the clamping means at both ends of the airfoil member and reclamping in a new position.

9. The mounting means according to claim 1, wherein each pair of securing means comprises a pair of gutter brackets, and a pair of gutter clamps associated with each gutter bracket, for securing the mounting means for the airfoil member to the roof of said vehicle.

10. The mounting means according to claim 9, wherein a pair of support arms is associated with each gutter racket for supporting the mounting means, a pair of grip washers being welded to respective parts enabling the support arms to be held rigidly at any desired inclination with respect to the gutter brackets.

* * * * *